United States Patent
Zhou

(10) Patent No.: US 11,451,340 B2
(45) Date of Patent: Sep. 20, 2022

(54) HYBRID AUTOMATIC REPEAT REQUEST(HARQ) FEEDBACK CONFIGURATION METHOD AND DEVICE AND DATA RECEIVING APPARATUS

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 7 days.

(21) Appl. No.: 16/899,444

(22) Filed: Jun. 11, 2020

(65) Prior Publication Data

US 2020/0304245 A1 Sep. 24, 2020

Related U.S. Application Data

(63) Continuation of application No. PCT/CN2017/119771, filed on Dec. 29, 2017.

(51) Int. Cl.
*H04L 1/18* (2006.01)
*H04B 7/0456* (2017.01)
*H04L 5/00* (2006.01)

(52) U.S. Cl.
CPC ......... *H04L 1/1812* (2013.01); *H04B 7/0482* (2013.01); *H04L 5/001* (2013.01); *H04L 5/0055* (2013.01)

(58) Field of Classification Search
CPC ..... H04L 5/0055; H04L 1/001; H04L 1/0073; H04L 1/1671; H04L 1/18
See application file for complete search history.

(56) References Cited

U.S. PATENT DOCUMENTS

| | | | |
|---|---|---|---|
| 2011/0243066 A1* | 10/2011 | Nayeb Nazar | H04L 1/1671 370/328 |
| 2014/0029532 A1 | 1/2014 | Han | |
| 2014/0112243 A1* | 4/2014 | Suzuki | H04W 56/00 370/328 |
| 2017/0134140 A1 | 5/2017 | Park | |
| 2018/0006791 A1 | 1/2018 | Marinier et al. | |
| 2018/0167173 A1 | 6/2018 | Guan et al. | |
| 2019/0150181 A1* | 5/2019 | Kim | H04L 1/1858 370/329 |

(Continued)

FOREIGN PATENT DOCUMENTS

| | | |
|---|---|---|
| CN | 104247320 A | 12/2014 |
| CN | 104320226 A | 1/2015 |

(Continued)

OTHER PUBLICATIONS

3GPP "3GPP TS 38 213 V1.3.0" 3GPP; Technical Specification Group Radio Access Network; NR; Physical layer procedures for control (Release 15), Dec. 15, 2017, section 9.1.

(Continued)

*Primary Examiner* — Ayaz R Sheikh
*Assistant Examiner* — Debebe A Asefa
(74) *Attorney, Agent, or Firm* — Syncoda LLC; Feng Ma

(57) ABSTRACT

A Hybrid Automatic Repeat reQuest (HARQ) feedback configuration method includes: configuring HARQ codebook switching information for a data sender according to carrier aggregation information; and sending the HARQ codebook switching information the data sender.

20 Claims, 7 Drawing Sheets

HARQ codebook switching information is configured for a data sender according to carrier aggregation information — S101

The HARQ codebook switching information is sent to the data sender — S102

(56) References Cited

U.S. PATENT DOCUMENTS

| | | |
|---|---|---|
| 2019/0356456 A1 | 11/2019 | Park |
| 2020/0228289 A1 | 7/2020 | He |

FOREIGN PATENT DOCUMENTS

| | | |
|---|---|---|
| CN | 104396174 A | 3/2015 |
| CN | 106549734 A | 3/2017 |
| CN | 107409014 A | 11/2017 |
| WO | 2017024539 A1 | 2/2017 |
| WO | 2017028001 A1 | 2/2017 |
| WO | 2017044066 A1 | 3/2017 |

OTHER PUBLICATIONS

Nokia, Nokia Shanghai Bell; "On remaining details of short PUCCH for UCI of more than 2 bits", 3GPP TSG RAN WG1 #90bis R1-1718305, Oct. 13, 2017, entire document.

ZTE, Sanechips; "Carrier Aggregation for CCs with Different Numerology", 3GPP TSG RAN WG1 Meeting 91 R1-1720367, Dec. 1, 2017, entire document.

International Search Report in the international application No. PCT/CN2017/119771, dated Aug. 29, 2018.

English Translation of the Written Opinion of the International Search Authority in the international application No. PCT/CN2017/119771, dated Aug. 29, 2018.

First Office Action of the Chinese application No. 201780002383.8, dated Jun. 3, 2020.

Notice of Allowance of the Chinese application No. 201780002383.8, dated Jun. 7, 2021.

Supplementary European Search Report in the European application No. 17936497.1, dated May 12, 2021.

* cited by examiner

HYBRID AUTOMATIC REPEAT REQUEST(HARQ) FEEDBACK CONFIGURATION METHOD AND DEVICE AND DATA RECEIVING APPARATUS

CROSS-REFERENCE TO RELATED APPLICATION

This application is a continuation of International Patent Application No. PCT/CN2017/119771 filed on Dec. 29, 2017, the disclosure of which is hereby incorporated by reference in its entirety.

BACKGROUND

Along with development of communication technologies, 5th Generation (5G) technologies have emerged. The types of services in 5G at least include enhanced Mobile Broad Band (eMBB), massive Machine Type Communication (mMTC), Ultra Reliable Low Latency Communication (URLLC), etc. All these services are data services but have different requirements on latency and reliability. For example, a URLLC service, which can be applied to the fields of Internet of vehicles and the like requiring low delays, has a very high requirement on timeliness, thereby being required to be timely established and even preempting a precedent service. An mMTC service is generally insensitive to delay, and data may be delivered at a relatively long time interval. A manner for effectively transmitting a delay-sensitive service is to improve transmission of a Hybrid Automatic Repeat reQuest (HARQ), for example, giving a retransmission feedback faster and more accurately. In 3rd Generation Partnership Project (3GPP) 5G New Radio (NR), retransmission of a Code Block Group (CBG) rather than retransmission of a Transmission Block (TB) in Long-Term Evolution (LTE) is implemented. CBG is a smaller data cell unit in TB.

SUMMARY

The present disclosure generally relates to the technical field of communications, and more specifically to a Hybrid Automatic Repeat reQuest (HARQ) feedback configuration method and apparatus, a method and device for determining data to be retransmitted, a data receiving apparatus, a data sending apparatus and a computer-readable storage medium.

According to a first aspect of embodiments of the present disclosure, a HARQ feedback configuration method may be applied to a data receiver and may include that:

HARQ codebook switching information is configured for a data sender according to carrier aggregation information; and the HARQ codebook switching information is sent to the data sender.

According to a second aspect of the embodiments of the present disclosure, a method for determining data to be retransmitted may be applied to a data sender and may include that:

HARQ codebook switching information sent by a data receiver is received; and the HARQ codebook switching information is stored to process, according to the HARQ codebook switching information, a HARQ codebook fed back by the data receiver to determine resource unit information of data to be retransmitted.

According to a third aspect of the embodiments of the present disclosure, a data receiving apparatus may include:

a processor; and a memory device configured to store instructions executable by the processor, wherein the processor may be configured to:

configure HARQ codebook switching information for a data sender according to carrier aggregation information; and send the HARQ codebook switching information to the data sender.

According to a fourth aspect of the embodiments of the present disclosure, a data sending apparatus may include:

a processor; and a memory device configured to store instructions executable by the processor, wherein the processor may be configured to:

receive HARQ codebook switching information from a data receiver; and store the HARQ codebook switching information to process, according to the HARQ codebook switching information, a HARQ codebook fed back by the data receiver to determine resource unit information of data to be retransmitted.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
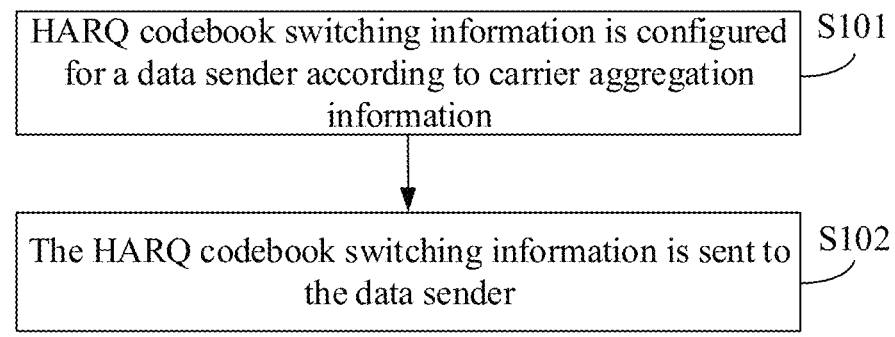
FIG. 1 is a flowchart showing a HARQ feedback configuration method according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

For HARQ retransmission of multiple carriers, it is needed to effectively code and aggregate retransmitted information of multiple Component Carriers (CCs) to implement unified postback of retransmitted bits.

There may be such a case that the numbers of CBGs in one TB in different CCs are different in the future. For this case, a length of a codebook to pass back may be determined according to a product of the maximum number of CBGs in a CC and the total number of times for which data is required to be transmitted. Or, a codebook may be fed back for the CCs including the same number of CBGs so as to reduce waste of feedback bits, however, it is needed to feed back multiple HARQ codebooks and maintain multiple counter of Downlink Assignment Indexes (DAIs) and total DAIs. Therefore, none of the feedback manners can be adapted to a complex condition.

FIG. 1 is a flowchart showing a HARQ feedback configuration method according to some embodiments of the present disclosure. The embodiment is described from the angle of a data receiver. The data receiver may be a base station or may also be User Equipment (UE). As shown in FIG. 1, the HARQ feedback configuration method includes the following blocks.

In S101, HARQ codebook switching information is configured for a data sender according to carrier aggregation information.

The operation that the HARQ codebook switching information is configured for the data sender according to the carrier aggregation information may include, but not limited to, any one or more of the following situations.

1) In response to that the total number of aggregated CCs is less than a preset threshold, a first HARQ codebook format is configured for the data sender; or in a case that the total number of the aggregated CCs is more than or equal to the preset threshold, a second HARQ codebook format is configured for the data sender.

The first HARQ codebook format may be determined by the maximum number of resource units in one of the aggregated CCs and the total number of times for which data is required to be transmitted by the aggregated CCs. The second HARQ codebook format may be determined by the number of resource units in a single CC in each CC group in the aggregated CCs and the total number of times for which the data is required to be transmitted by the corresponding CC group. The CCs including the same number of resource units in the aggregated CCs may be divided into a group. The resource unit may include, but not limited to, a CBG.

Figure 2:
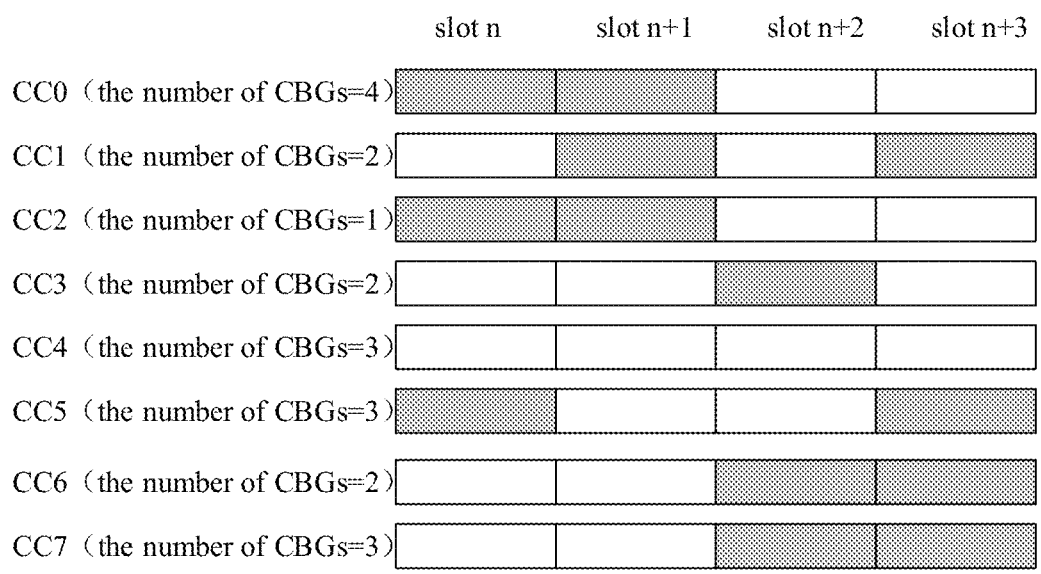
FIG. 2 is a schematic diagram illustrating aggregated CCs corresponding to a first HARQ codebook format according to some embodiments of the present disclosure.
Figure 3:
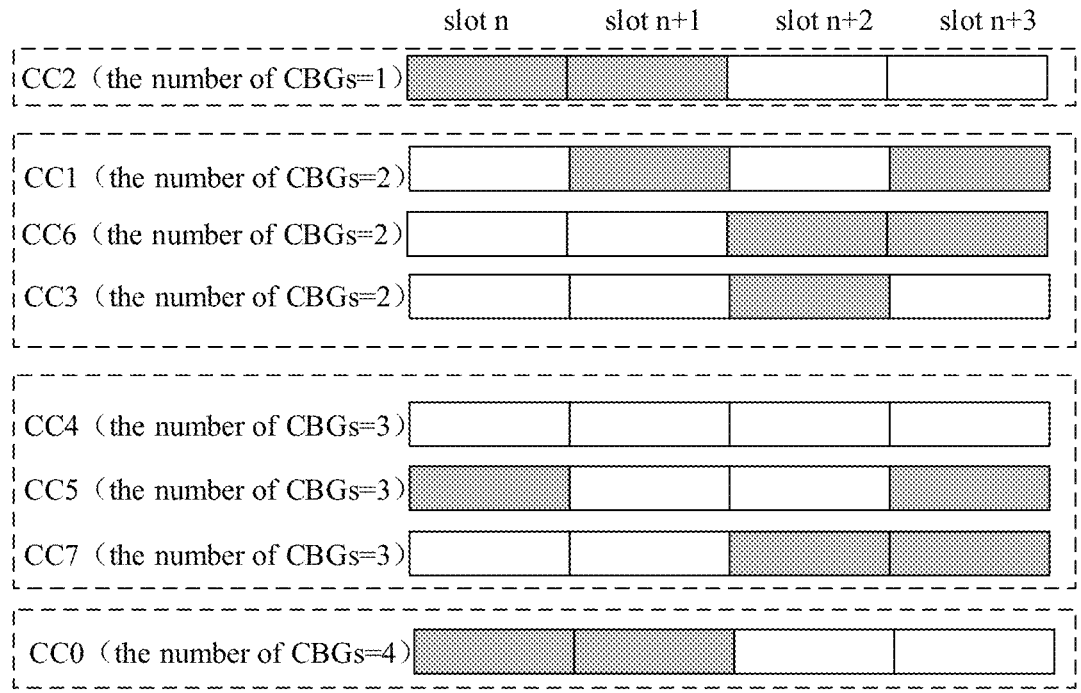
FIG. 3 is a schematic diagram illustrating aggregated CCs corresponding to a second HARQ codebook format according to some embodiments of the present disclosure.

For describing a difference between the first HARQ codebook format and the second HARQ codebook format more clearly, descriptions will be made below with 8 CCs as an example. In this example, CC0 includes 4 CBGs, CC1 includes 2 CBGs, CC2 includes 1 CBG, CC3 includes 2 CBGs, CC4 includes 3 CBGs, CC5 includes 3 CBGs, CC6 includes 2 CBGs, and CC7 includes 3 CBGs. In FIG. 2, the grey block represents a slot where there is data transmitted. It can be seen from FIG. 2 that the total number of times for which the data is required to be transmitted by CC0 to CC7 is 13 and the maximum number of CBGs in a single CC is 4, and in such case, the first codebook format may include 1 codebook and a total length of the codebook may be 13*4=52 bits. For describing the second codebook format, the CCs are required to be grouped. For example, the CCs in FIG. 2 may be divided into multiple CC groups shown in FIG. 3. It can be seen from FIG. 3 that CC2 in the first CC group includes 1 CBG and the total number of times for which the data is required to be transmitted by CC2 is 2; each CC in the second CC group includes 2 CBG and the total number of times for which the data is required to be transmitted by the second CC group is 5; each CC in the third CC group includes 3 CBGs and the total number of times for which the data is required to be transmitted by the third CC group is 4; CC0 in the fourth CC group includes 4 CBGs and the total number of times for which the data is required to be transmitted by CC0 is 2. The second codebook format may include 4 codebooks, and a total length of the codebooks may be 1*2+2*5+3*4+4*2=36 bits.

This switching manner may be adapted to the changes in the total number of aggregated CCs well, and a feedback overhead may be reduced.

2) In response to that all the CCs in the aggregated CCs include the same number of resource units, the first HARQ codebook format is configured for the data sender; or when CCs in the aggregated CCs include different numbers of resource units, the second HARQ codebook format is configured for the data sender.

This switching manner may be adapted to distribution changes of the amount of resource units of the aggregated CCs well, and a feedback overhead may be reduced.

3) In response to that a service born in the aggregated CCs does not include a preset service, the first HARQ codebook format is configured for the data sender; or in response to that a service born in the aggregated CCs includes a preset service, the second HARQ codebook format is configured for the data sender.

The preset service may include, but not limited to, a URLLC service.

This switching manner may be adapted to changes of service requirements well, and a feedback overhead may be reduced.

4) In response to that a traffic volume of a service born in the aggregated CCs is larger than or equal to a preset traffic volume, the first HARQ codebook format is configured for the data sender; or in response to that a traffic volume of a service born in the aggregated CCs is smaller than a preset traffic volume, the second HARQ codebook format is configured for the data sender.

This switching manner may be adapted to changes of transmission requirements well, and a feedback overhead may be reduced.

5) in response to transmission of a service born in the aggregated CCs being distributed in CCs comprising different numbers of resource units, the first HARQ codebook format is configured for the data sender; or in response to transmission of a service born in the aggregated CCs being concentrated in CCs comprising a same number of resource units, the second HARQ codebook format is configured for the data sender.

This switching manner may be adapted to distribution changes of service transmission well, and a feedback overhead may be reduced.

In S102, the HARQ codebook switching information is sent to the data sender.

In response to that the data receiver is a base station, the data sender may be UE; or in response to that the data receiver is UE, the data sender may be a base station. In the embodiment, the data receiver, after configuring the HARQ codebook switching information, may send the HARQ codebook switching information to the data sender, so that the data sender may determine resource unit information of data to be retransmitted according to the received HARQ codebook switching information.

According to these embodiments, HARQ codebook switching information may be configured for a data sender according to carrier aggregation information for adaptation to a complex condition, and the HARQ codebook switching information may be sent to the data sender, so that the data sender may accordingly determine resource unit information of data to be retransmitted.

Figure 4:
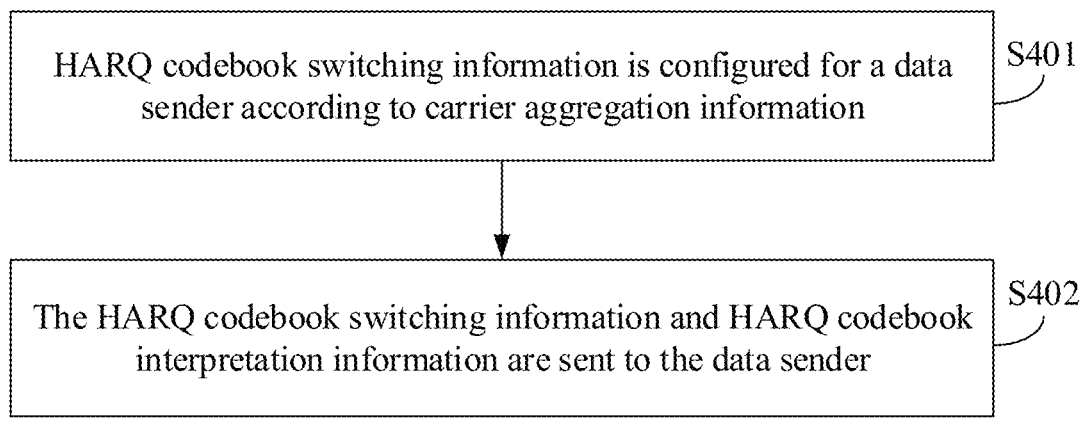
FIG. 4 is a flowchart showing another HARQ feedback configuration method according to some embodiments of the present disclosure.

FIG. 4 is a flowchart showing another HARQ feedback configuration method according to some embodiments of the present disclosure. As shown in FIG. 4, the method may include the following blocks.

In S401, HARQ codebook switching information is configured for a data sender according to carrier aggregation information.

In S402, the HARQ codebook switching information and HARQ codebook interpretation information are sent to the data sender, the HARQ codebook interpretation information referring to that each feedback bit corresponding to each HARQ codebook represents HARQ feedback information of a resource unit or HARQ feedback information of multiple resource units.

The HARQ codebook interpretation information may have different interpretations for same codebook feedback information. For example, 8 bit feedback information may be interpreted as HARQ feedback information of 8 resource units such as 8 CBGs, or may also be interpreted as HARQ feedback information obtained after AND OR calculation of 16 resource units such as 16 CBGs in pairs. In a case of a high service traffic volume, each feedback bit may represent AND OR information of more than 2 resource units such as CBGs, so that a feedback overhead may be reduced.

The HARQ codebook switching information and the HARQ codebook interpretation information may be represented by same information. Namely, the HARQ codebook switching information and the HARQ codebook interpretation information can be the same information. In addition, the HARQ codebook switching information and the HARQ codebook interpretation information may be two pieces of information.

According to these embodiments, HARQ codebook switching information and HARQ codebook interpretation information may be sent to a data sender, so that a change of a service transmission requirement may be adapted better.

Figure 5:
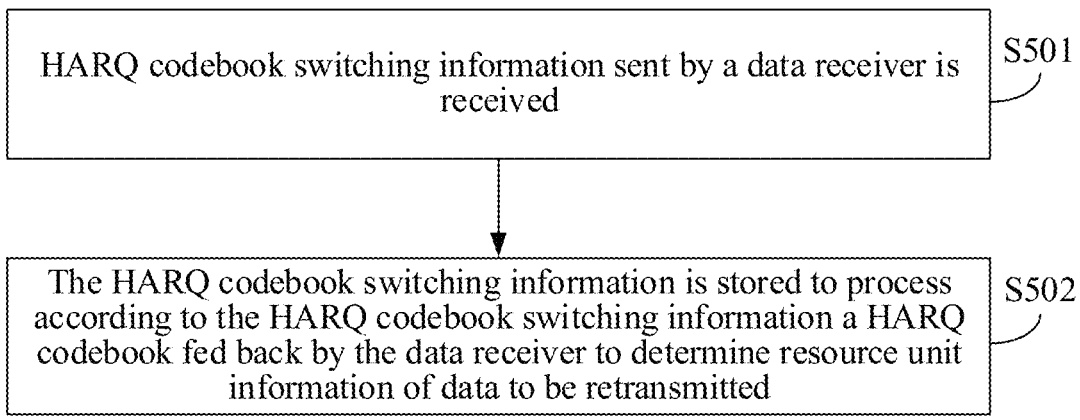
FIG. 5 is a flowchart showing a method for determining data to be retransmitted according to some embodiments of the present disclosure.

FIG. 5 is a flowchart showing a method for determining data to be retransmitted according to some embodiments of the present disclosure. The embodiment is described from the angle of a data sender. The data sender may be UE or may be a base station. As shown in FIG. 5, the method includes the following blocks.

In S501, HARQ codebook switching information sent by a data receiver is received.

In S502, the HARQ codebook switching information is stored to process, according to the HARQ codebook switching information, a HARQ codebook fed back by the data receiver to determine resource unit information of data to be retransmitted.

According to these embodiments, the HARQ codebook switching information sent by the data receiver may be received and stored to process, according to the HARQ codebook switching information, the HARQ codebook fed back by the data receiver under a complex condition, so that the resource unit information of the data to be retransmitted may be determined with a low feedback overhead.

Figure 6:
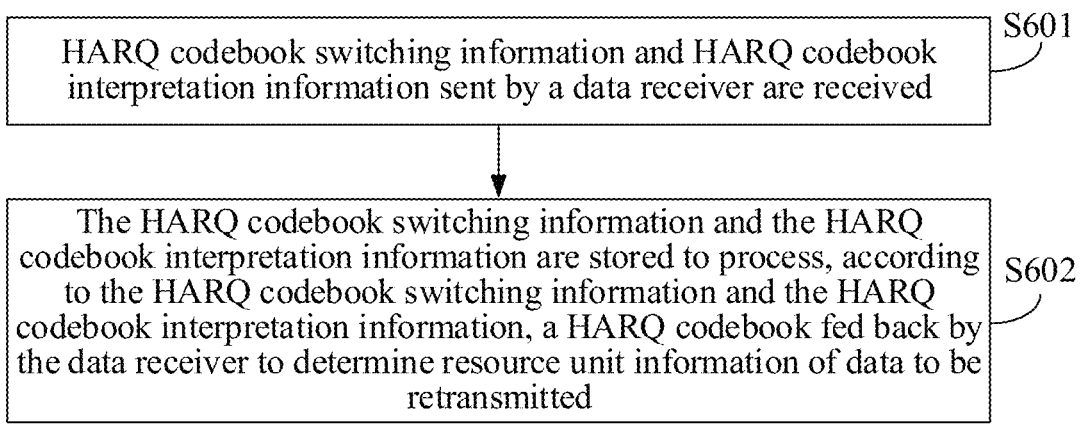
FIG. 6 is a flowchart showing another method for determining data to be retransmitted according to some embodiments of the present disclosure.

FIG. 6 is a flowchart showing another method for determining data to be retransmitted according to some embodiments of the present disclosure. The embodiment is described from a data sender. As shown in FIG. 6, the method includes the following blocks.

In S601, HARQ codebook switching information and HARQ codebook interpretation information sent by a data receiver are received.

In S602, the HARQ codebook switching information and the HARQ codebook interpretation information are stored to process, according to the HARQ codebook switching information and the HARQ codebook interpretation information, a HARQ codebook fed back by the data receiver to determine resource unit information of data to be retransmitted.

The HARQ codebook interpretation information may refer to that each feedback bit corresponding to each codebook represents HARQ feedback information of a resource unit or HARQ feedback information of multiple resource units.

The HARQ codebook switching information and the HARQ codebook interpretation information may be represented by same information, namely the HARQ codebook switching information and the HARQ codebook interpretation information are the same information. In addition, the HARQ codebook switching information and the HARQ codebook interpretation information may be two pieces of information.

According to these embodiments, the HARQ codebook switching information and HARQ codebook interpretation information sent by the data receiver may be received and stored, so that a change of a service transmission requirement may be adapted better.

Figure 7:
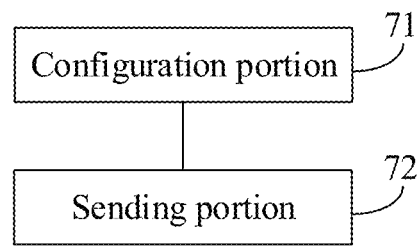
FIG. 7 is a block diagram of a HARQ feedback configuration device according to some embodiments of the present disclosure.

FIG. 7 is a block diagram of a HARQ feedback configuration device according to some embodiments of the present disclosure. The HARQ feedback configuration device may be applied to a data receiver. As shown in FIG. 7, the apparatus includes a configuration portion 71 and a sending portion 72.

The configuration portion 71 is configured to configure HARQ codebook switching information for a data sender according to carrier aggregation information.

The sending portion 72 is configured to send the HARQ codebook switching information configured by the configuration portion 71 to the data sender.

In addition, the sending portion 72 may further be configured to, when sending the HARQ codebook switching information to the data sender, send HARQ codebook interpretation information to the data sender, the HARQ codebook interpretation information referring to that each feedback bit corresponding to each HARQ codebook represents HARQ feedback information of a resource unit or HARQ feedback information of multiple resource units.

The HARQ codebook interpretation information may have different interpretations for the same codebook feedback information. For example, 8 bit feedback information may be interpreted as HARQ feedback information of 8 resource units such as 8 CBGs, or may be interpreted as HARQ feedback information obtained after AND OR calculation of 16 resource units such as 16 CBGs in pairs. In a case of a relatively high service traffic volume, each feedback bit may represent AND OR information of more than 2 resource units such as CBGs, so that a feedback overhead may be reduced.

The HARQ codebook switching information and the HARQ codebook interpretation information may be represented by same information, namely the HARQ codebook switching information and the HARQ codebook interpretation information are the same information. In addition, the HARQ codebook switching information and the HARQ codebook interpretation information may be two pieces of information.

According to these embodiments, the HARQ codebook switching information and the HARQ codebook interpretation information may be sent to the data sender, so that a change of a service transmission requirement may be adapted better.

According to these embodiments, the HARQ codebook switching information may be configured for the data sender according to the carrier aggregation information for adaptation to a complex condition, and the HARQ codebook switching information may be sent to the data sender, so that the data sender may accordingly determine resource unit information of data to be retransmitted.

Figure 8:
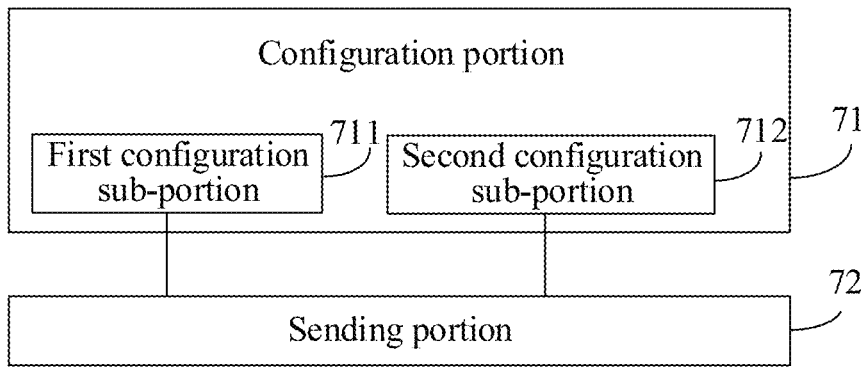
FIG. 8 is a block diagram of another HARQ feedback configuration device according to some embodiments of the present disclosure.

FIG. 8 is a block diagram of another HARQ feedback configuration device according to some embodiments of the present disclosure. As shown in FIG. 8, based on the embodiment shown in FIG. 7, the configuration portion 71 may include a first configuration sub-portion 711 and a second configuration sub-portion 712.

The first configuration sub-portion 711 is configured to, in response to that a total number of aggregated Component Carriers (CCs) is less than a preset threshold, configure a first HARQ codebook format for the data sender, the first HARQ codebook format being determined by a maximum number of resource units in one of the aggregated CCs and a total number of times for which data is required to be transmitted by the aggregated CCs.

The second configuration sub-portion 712 is configured to, in response to that the total number of the aggregated CCs is more than or equal to the preset threshold, configure a second HARQ codebook format for the data sender, the second HARQ codebook format being determined by a number of resource units in a CC in each CC group in the aggregated CCs and a total number of times for which data is required to be transmitted by a corresponding CC group, and CCs comprising a same number of resource units in the aggregated CCs being divided into a group.

For describing a difference between the first HARQ codebook format and the second HARQ codebook format more clearly, descriptions will be made below with 8 CCs as an example. In the example, CC0 includes 4 CBGs, CC1 includes 2 CBGs, CC2 includes 1 CBG, CC3 includes 2 CBGs, CC4 includes 3 CBGs, CC5 includes 3 CBGs, CC6 includes 2 CBGs, and CC7 includes 3 CBGs. In FIG. 2, the grey block represents a slot where there is data transmitted, and the number on the grey block represents a serial number of the data to be transmitted. It can be seen from FIG. 2 that the total number of times for which the data is required to be transmitted by CC0 to CC7 is 13 and the maximum number of CBGs in a single CC is 4, and in such case, the first codebook format may include 1 codebook and a total length of the codebook is 13*4=52 bits. For describing the second codebook format, the CCs are required to be grouped. For example, the CCs in FIG. 2 may be divided into multiple CC groups shown in FIG. 3. It can be seen from FIG. 3 that CC2 in the first CC group includes 1 CBG and the total number of times for which the data is required to be transmitted by CC2 is 2; each CC in the second CC group includes 2 CBG and the total number of times for which the data is required to be transmitted by the second CC group is 5; each CC in the third CC group includes 3 CBGs and the total number of times for which the data is required to be transmitted by the third CC group is 4; and CC0 in the fourth CC group includes 4 CBGs and the total number of times for which the data is required to be transmitted by CC0 is 2. The second codebook format may include 4 codebooks, and a total length of the codebooks is 1*2+2*5+3*4+4*2=36 bits.

The embodiment may be adapted to a change of the total number of the aggregated CCs well, and a feedback overhead may be reduced.

Figure 9:
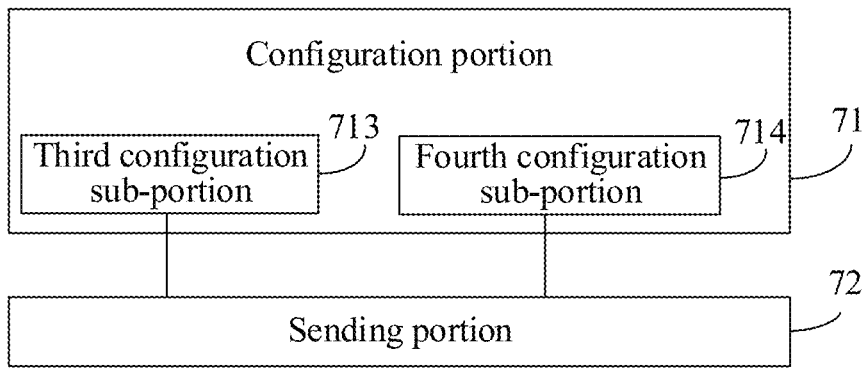
FIG. 9 is a block diagram of another HARQ feedback configuration device according to some embodiments of the present disclosure.

FIG. 9 is a block diagram of another HARQ feedback configuration device according to some embodiments of the present disclosure. As shown in FIG. 9, based on the embodiment shown in FIG. 7, the configuration portion 71 may include a third configuration sub-portion 713 and a fourth configuration sub-portion 714.

The third configuration sub-portion 713 is configured to, in response to that all of the aggregated CCs comprise a same number of resource units, configure a first HARQ codebook format for the data sender, the first HARQ codebook format being determined by a maximum number of resource units in one of the aggregated CCs and a total number of times for which data is required to be transmitted by the aggregated CCs.

The fourth configuration sub-portion 714 is configured to, in response to that CCs in the aggregated CCs comprise different numbers of resource units, configure a second HARQ codebook format for the data sender, the second HARQ codebook format being determined by the number of resource units in a CC in each CC group in the aggregated CCs and a total number of times for which data is required to be transmitted by a corresponding CC group, and CCs comprising a same number of resource units in the aggregated CCs being divided into a group.

The embodiment may be adapted to a distribution change of the amount of resource units of the aggregated CCs well, and a feedback overhead may be reduced.

Figure 10:
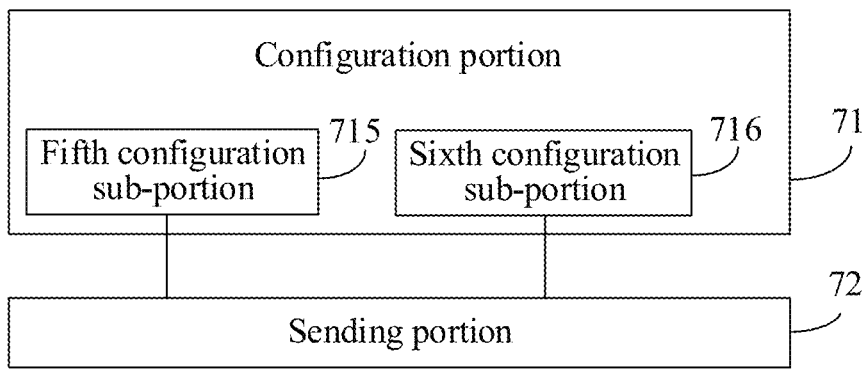
FIG. 10 is a block diagram of another HARQ feedback configuration device according to some embodiments of the present disclosure.

FIG. 10 is a block diagram of another HARQ feedback configuration device according to some embodiments of the present disclosure. As shown in FIG. 10, based on the embodiment shown in FIG. 7, the configuration portion 71 may include a fifth configuration sub-portion 715 and a sixth configuration sub-portion 716.

The fifth configuration sub-portion 715 is configured to, in response to that a service born in the aggregated CCs does not comprise a preset service, configure a first HARQ codebook format for the data sender, the first HARQ codebook format being determined by a maximum number of resource units in one of the aggregated CCs and a total number of times for which the data is required to be transmitted by the aggregated CCs.

The sixth configuration sub-portion 716 is configured to, in response to that the service born in the aggregated CCs comprises the preset service, configure a second HARQ codebook format for the data sender, the second HARQ codebook format being determined by the number of resource units in a CC in each CC group in the aggregated CCs and a total number of times for which data is required to be transmitted by a corresponding CC group, and CCs comprising a same number of resource units in the aggregated CCs being divided into a group.

The preset service may include, but not limited to, a URLLC service.

The embodiment may be adapted to a change of a service requirement well, and a feedback overhead may be reduced.

Figure 11:
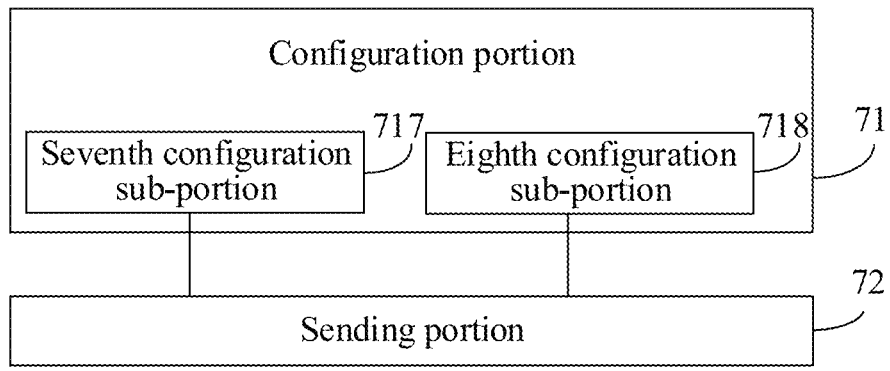
FIG. 11 is a block diagram of another HARQ feedback configuration device according to some embodiments of the present disclosure.

FIG. 11 is a block diagram of another HARQ feedback configuration device according to some embodiments of the present disclosure. As shown in FIG. 11, based on the embodiment shown in FIG. 7, the configuration portion 71 may include a seventh configuration sub-portion 717 and an eighth configuration sub-portion 718.

The seventh configuration sub-portion 717 is configured to, in response to that a traffic volume of a service born in the aggregated CCs is larger than or equal to a preset traffic volume, configure a first HARQ codebook format for the data sender, the first HARQ codebook format being determined by a maximum number of resource units in one of the aggregated CCs and a total number of times for which data is required to be transmitted by the aggregated CCs.

The eighth configuration sub-portion 718 is configured to, in response to that the traffic volume of the service born in the aggregated CCs is smaller than the preset traffic volume, configure a second HARQ codebook format for the data sender, the second HARQ codebook format being determined by the number of resource units in a CC in each CC group in the aggregated CCs and a total number of times for which data is required to be transmitted by a corresponding CC group, and CCs comprising a same number of resource units in the aggregated CCs being divided into a group.

The embodiment may be adapted to changes of transmission requirements well, and the feedback overhead may be reduced.

Figure 12:
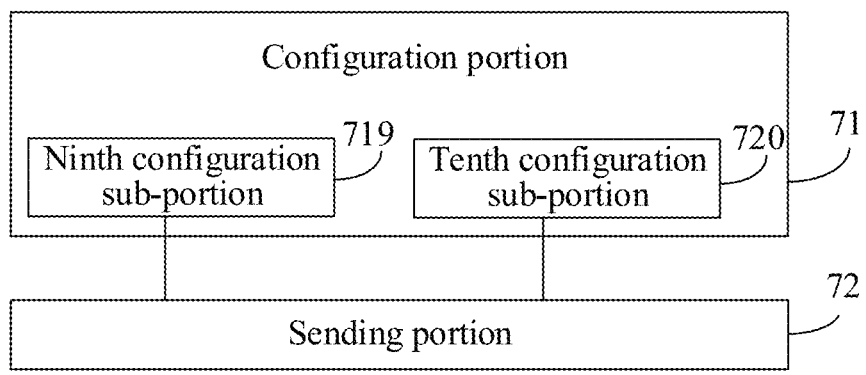
FIG. 12 is a block diagram of another HARQ feedback configuration device according to some embodiments of the present disclosure.

FIG. 12 is a block diagram of another HARQ feedback configuration device according to some embodiments of the present disclosure. As shown in FIG. 12, based on the embodiment shown in FIG. 7, the configuration portion 71 may include a ninth configuration sub-portion 719 and a tenth configuration sub-portion 720.

The ninth configuration sub-portion 719 is configured to, in response to transmission of a service born in the aggregated CCs being distributed in CCs comprising different numbers of resource units, configure a first HARQ codebook format for the data sender, the first HARQ codebook format being determined by a maximum number of resource units in one of the aggregated CCs and a total number of times for which data is required to be transmitted by the aggregated CCs.

The tenth configuration sub-portion 720 is configured to, in response to transmission of the service born in the aggregated CCs being concentrated in CCs comprising a same number of resource units, configure a second HARQ codebook format for the data sender, the second HARQ codebook format being determined by the number of resource units in a CC in each CC group in the aggregated CCs and a total number of times for which data is required to be transmitted by a corresponding CC group, and CCs comprising a same number of resource units in the aggregated CCs being divided into a group.

The embodiment may be adapted to distribution changes of service transmission well, and the feedback overhead may be reduced.

Figure 13:
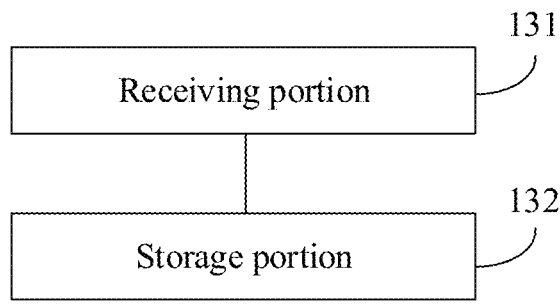
FIG. 13 is a block diagram of a device for determining data to be retransmitted according to some embodiments of the present disclosure.

FIG. 13 is a block diagram of a device for determining data to be retransmitted according to some embodiments of the present disclosure. The device may be applied to a data sender. As shown in FIG. 13, the device may include a receiving portion 131 and a storage portion 132.

The receiving portion 131 is configured to receive a HARQ codebook switching information sent by a data receiver.

The storage portion 132 is configured to store the HARQ codebook switching information received by the receiving portion 131 to process, according to the HARQ codebook switching information, a HARQ codebook fed back by the data receiver to determine resource unit information of data to be retransmitted.

In some embodiments, the receiving portion 131 may further be configured to, when receiving the HARQ codebook switching information from the data receiver is received, receive HARQ codebook interpretation information from the data receiver. The storage portion 132 may further be configured to store the HARQ codebook interpretation information received by the receiving portion, the HARQ codebook interpretation information referring to that each feedback bit corresponding to each codebook represents HARQ feedback information of a resource unit or HARQ feedback information of multiple resource units.

The HARQ codebook switching information and the HARQ codebook interpretation information may be represented by same information, namely the HARQ codebook switching information and the HARQ codebook interpretation information are the same information. In addition, the HARQ codebook switching information and the HARQ codebook interpretation information may be two pieces of information.

According to these embodiments, the HARQ codebook switching information and HARQ codebook interpretation information sent by the data receiver may be received and stored, so that a change of a service transmission requirement may be adapted better, and a feedback overhead may be reduced.

According to these embodiments, the HARQ codebook switching information sent by the data receiver may be received and stored to process, according to the HARQ codebook switching information, the HARQ codebook fed back by the data receiver under a complex condition, so that the resource unit information of the data to be retransmitted may be determined with a low feedback overhead.

Figure 14:
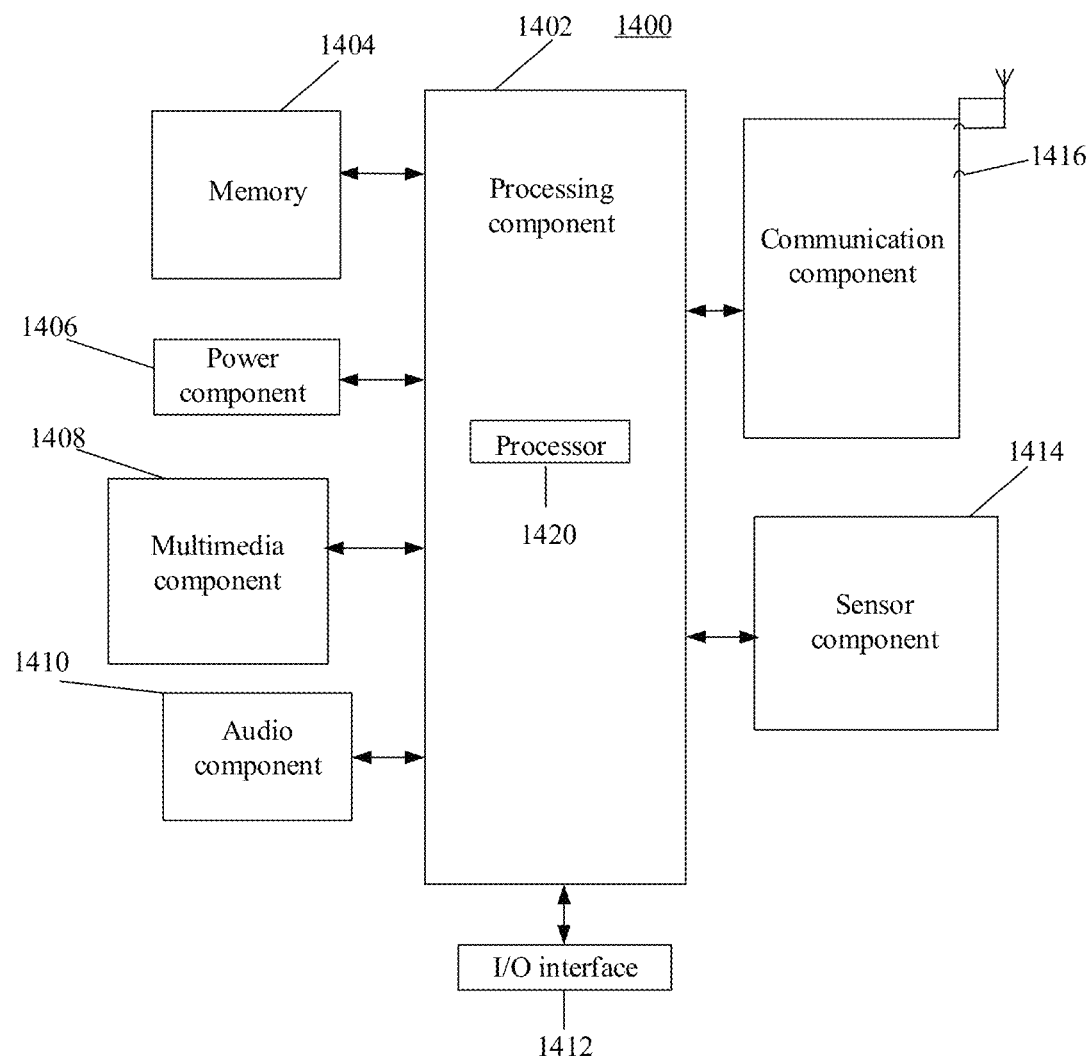
FIG. 14 is a block diagram of a HARQ feedback configuration device or a device for determining data to be retransmitted according to some embodiments of the present disclosure.

FIG. 14 is a block diagram of a HARQ feedback configuration device or a device for determining data to be retransmitted according to some embodiments of the present disclosure. For example, the device 1400 may be UE such as a mobile phone, a computer, a digital broadcast terminal, a messaging device, a gaming console, a tablet, a medical device, exercise equipment and a personal digital assistant.

Referring to FIG. 14, the device 1400 may include one or more of the following components: a processing component 1402, a memory component 1404, a power component 1406, a multimedia component 1408, an audio component 1410, an Input/Output (I/O) interface 1412, a sensor component 1414, and a communication component 1416.

The processing component 1402 typically controls overall operations of the device 1400, such as the operations associated with display, telephone calls, data communications, camera operations, and recording operations. The processing component 1402 may include one or more processors 1420 to execute instructions to perform all or part of the steps in the abovementioned method. Moreover, the processing component 1402 may include one or more modules which facilitate interaction between the processing component 1402 and the other components. For instance, the processing component 1402 may include a multimedia module to facilitate interaction between the multimedia component 1408 and the processing component 1402.

In response to that the device 1400 is the HARQ feedback configuration device, one processor 1420 in the processing component 1402 may be configured to:

configure HARQ codebook switching information for a data sender according to carrier aggregation information; and send the HARQ codebook switching information to the data sender.

In response to that the device 1400 is the device for determining data to be retransmitted, one processor 1420 in the processing component 1402 may be configured to:

receive HARQ codebook switching information from a data receiver; and store the HARQ codebook switching information to process, according to the HARQ codebook switching information, a HARQ codebook fed back by the data receiver to determine resource unit information of data to be retransmitted.

The memory 1404 is configured to store various types of data to support the operation of the device 1400. Examples of such data include instructions for any applications or methods operated on the device 1400, contact data, phonebook data, messages, pictures, video, etc. The memory 1404 may be implemented by any type of volatile or non-volatile memory devices, or a combination thereof, such as an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1406 is configured to provide power for various components of the device 1400. The power component 1406 may include a power management system, one or more power supplies, and other components associated with generation, management and distribution of power for the device 1400.

The multimedia component 1408 may include a screen providing an output interface between the device 1400 and a user. In some embodiments, the screen may include a Liquid Crystal Display (LCD) and a Touch Panel (TP). In some embodiments, organic light-emitting diode (OLED) or other types of displays can be employed. If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1408 includes a front camera and/or a rear camera. The front camera and/or the rear camera may receive external multimedia data when the device 1400 is in an operation mode, such as a photographing mode or a video mode. Each of the front camera and the rear camera may be a fixed optical lens system or have focusing and optical zooming capabilities.

The audio component 1410 is configured to output and/or input an audio signal. For example, the audio component 1410 includes a Microphone (MIC), and the MIC is configured to receive an external audio signal when the device 1400 is in the operation mode, such as a call mode, a recording mode and a voice recognition mode. The received audio signal may further be stored in the memory 1404 or sent through the communication component 1416. In some embodiments, the audio component 1410 further includes a speaker configured to output the audio signal.

The I/O interface 1412 is configured to provide an interface between the processing component 1402 and a peripheral interface module, and the peripheral interface module may be a keyboard, a click wheel, a button and the like. The button may include, but not limited to: a home button, a volume button, a starting button and a locking button.

The sensor component 1414 may include one or more sensors configured to provide status assessment in various aspects for the device 1400. For instance, the sensor component 1414 may detect an on/off status of the device 1400 and relative positioning of components, such as a display and small keyboard of the device 1400, and the sensor component 1414 may further detect a change in a position of the device 1400 or a component of the device 1400, presence or absence of contact between the user and the device 1400, orientation or acceleration/deceleration of the device 1400 and a change in temperature of the device 1400. The sensor component 1414 may include a proximity sensor configured to detect presence of an object nearby without any physical contact. The sensor component 1414 may also include a light sensor, such as a Complementary Metal Oxide Semiconductor (CMOS) or Charge Coupled Device (CCD) image sensor, configured for use in an imaging application. In some embodiments, the sensor component 1414 may also include an acceleration sensor, a gyroscope sensor, a magnetic sensor, a pressure sensor or a temperature sensor.

The communication component 1416 is configured to facilitate wired or wireless communication between the device 1400 and another apparatus. The device 1400 may access a communication-standard-based wireless network, such as a Wireless Fidelity (Wi-Fi) network, a 2nd-Generation (2G), 3rd-Generation (3G), $4^{th}$-Generation (4G), or $5^{th}$-Generation (5G) network or a combination thereof. In some embodiments, the communication component 1416 receives a broadcast signal or broadcast associated information from an external broadcast management system through a broadcast channel. In some embodiments, the communication component 1416 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In some embodiments, the device 1400 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In some embodiments, there is also provided a non-transitory computer-readable storage medium including instructions, such as the memory 1404 including instructions, and the instructions may be executed by the processor 1420 of the device 1400 to implement the abovementioned method. For example, the non-transitory computer-readable storage medium may be a ROM, a Compact Disc Read-Only Memory (CD-ROM), a magnetic tape, a floppy disc, an optical data storage device and the like.

Figure 15:
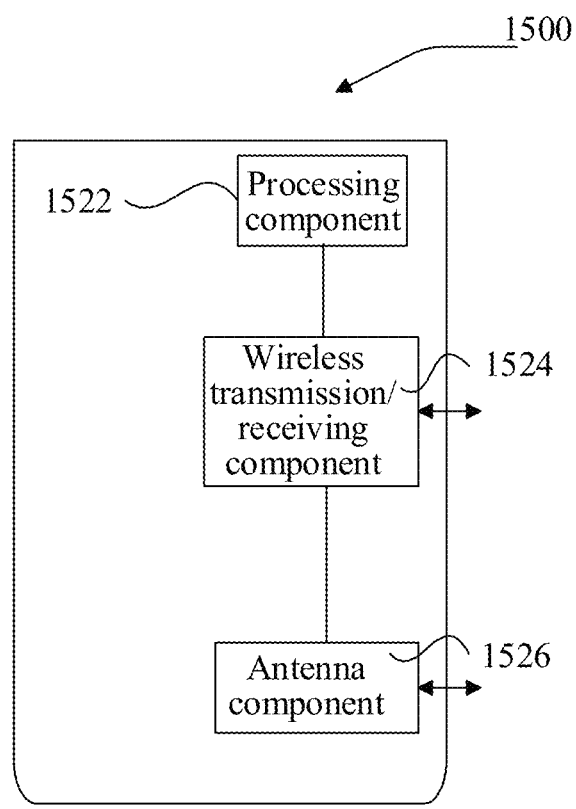
FIG. 15 is a block diagram of a HARQ feedback configuration device or a device for determining data to be retransmitted according to some embodiments of the present disclosure.

FIG. 15 is a block diagram of a HARQ feedback configuration device or a device for determining data to be retransmitted according to some embodiments. The device 1500 may be provided as a base station. Referring to FIG. 15, the device 1500 includes a processing component 1522, a wireless transmission/receiving component 1524, an antenna component 1526 and a wireless interface-specific signal processing part, and the processing component 1522 may further include one or more processors.

In response to that the device 1500 is the HARQ feedback configuration device, one processor in the processing component 1522 may be configured to:

configure HARQ codebook switching information for a data sender according to carrier aggregation information; and send the HARQ codebook switching information to the data sender.

In response to that the device 1500 is the device for determining data to be retransmitted, one processor in the processing component 1522 may be configured to:

receive HARQ codebook switching information from a data receiver; and store the HARQ codebook switching information to process, according to the HARQ codebook switching information, a HARQ codebook fed back by the data receiver to determine resource unit information of data to be retransmitted.

In some embodiments, there is also provided a non-transitory computer-readable storage medium including instructions, and the instructions may be executed by the processing component 1522 of the device 1500 to implement the HARQ feedback configuration method or the method for determining data to be retransmitted. For example, the non-transitory computer-readable storage medium may be a ROM, a RAM, a CD-ROM, a magnetic tape, a floppy disc, an optical data storage device and the like.

The device and apparatus embodiments substantially correspond to the method embodiments, and thus related parts refer to part of descriptions of the method embodiments. The device and apparatus embodiments described above are only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the embodiments.

Various embodiments of the present disclosure can have one or more of the following advantages.

HARQ codebook switching information may be configured for a data sender according to carrier aggregation information for adaptation to a complex condition, and the HARQ codebook switching information may be sent to the data sender, so that the data sender may accordingly determine resource unit information of data to be retransmitted.

The HARQ codebook switching information sent by the data receiver may be received and stored to process, according to the HARQ codebook switching information, a HARQ codebook fed back by a data receiver under the complex condition, so that the resource unit information of the data to be retransmitted may be determined with a low feedback overhead.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A hybrid automatic repeat request (HARQ) feedback configuration method, implemented by a data receiver, the method comprising:
    configuring HARQ codebook switching information for a data sender according to carrier aggregation information; and
    sending the HARQ codebook switching information to the data sender,
    wherein the carrier aggregation information comprises at least one of following parameters:
        a type of a service born in aggregated Component Carriers (CCs);
        a traffic volume of the service born in the aggregated CCs; or
        a manner of transmission of the service born in the aggregated CCs,
    wherein the HARQ codebook switching information is information about switching between a first HARQ codebook format and a second HARQ codebook format,
    where the first HARQ codebook format is determined by a maximum number of resource units in one of the aggregated CCs and a total number of times for which data is required to be transmitted by the aggregated CCs, and
    the second HARQ codebook format is determined by the number of resource units in a CC in each CC group in the aggregated CCs and a total number of times for which data is required to be transmitted by a corresponding CC group, and CCs comprising a same number of resource units in the aggregated CCs are divided into a group.

2. The method of claim 1, further comprising:
    when sending the HARQ codebook switching information to the data sender, sending HARQ codebook interpretation information to the data sender, where the HARQ codebook interpretation information refers to that each feedback bit corresponding to each HARQ codebook represents HARQ feedback information of a resource unit or HARQ feedback information of multiple resource units.

3. The method of claim 2, wherein the resource unit comprises a Code Block Group (CBG), or the HARQ codebook switching information and the HARQ codebook interpretation information are represented by same information.

4. The method of claim 1, wherein the configuring the HARQ codebook switching information for the data sender according to the carrier aggregation information comprises:
    in response to that a total number of the aggregated CCs is less than a preset threshold, configuring the first HARQ codebook format for the data sender; or in response to that a total number of the aggregated CCs is more than or equal to a preset threshold, configuring the second HARQ codebook format for the data sender.

5. The method of claim 1, wherein the configuring the HARQ codebook switching information for the data sender according to the carrier aggregation information comprises:
in response to that all of the aggregated CCs comprise a same number of resource units, configuring the first HARQ codebook format for the data sender; or
in response to that CCs in the aggregated CCs comprise different numbers of resource units, configuring the second HARQ codebook format for the data sender.

6. The method of claim 1, wherein the configuring the HARQ codebook switching information for the data sender according to the carrier aggregation information comprises:
in response to that the service born in the aggregated CCs does not comprise a preset service, configuring the first HARQ codebook format for the data sender; or
in response to that the service born in the aggregated CCs comprises a preset service, configuring the second HARQ codebook format for the data sender.

7. The method of claim 1, wherein the configuring the HARQ codebook switching information for the data sender according to the carrier aggregation information comprises:
in response to that the traffic volume of the service born in the aggregated CCs is larger than or equal to a preset traffic volume, configuring the first HARQ codebook format for the data sender; or
in response to that the traffic volume of the service born in the aggregated CCs is smaller than a preset traffic volume, configuring the second HARQ codebook format for the data sender.

8. The method of claim 1, wherein the configuring the HARQ codebook switching information for the data sender according to the carrier aggregation information comprises:
in response to transmission of the service born in the aggregated CCs being distributed in CCs comprising different numbers of resource units, configuring the first HARQ codebook format for the data sender; or
in response to transmission of the service born in the aggregated CCs being concentrated in CCs comprising a same number of resource units, configuring the second HARQ codebook format for the data sender.

9. A communication system implementing the method of claim 1, comprising the data receiver and the data sender, wherein each of the data receiver and the data sender is one of a base station and a mobile terminal; wherein:
the data sender is configured to:
receive the HARQ codebook switching information from the data receiver; and
store the HARQ codebook switching information to process, according to the HARQ codebook switching information, a HARQ codebook fed back by the data receiver to determine resource unit information of data to be retransmitted;
the HARQ codebook switching information is configured for the data sender according to the carrier aggregation information for adaptation to a complex condition, and the HARQ codebook switching information is sent to the data sender to facilitate the data sender accordingly determining the resource unit information of data to be retransmitted;
the HARQ codebook switching information sent by the data receiver is received and stored to process, according to the HARQ codebook switching information, the HARQ codebook fed back by the data receiver under the complex condition, such that the resource unit information of the data to be retransmitted is determined with a reduced feedback overhead.

10. A method for determining data to be retransmitted, implemented by a data sender, the method comprising:
receiving Hybrid Automatic Repeat reQuest (HARQ) codebook switching information from a data receiver; and
storing the HARQ codebook switching information to process, according to the HARQ codebook switching information, a HARQ codebook fed back by the data receiver to determine resource unit information of data to be retransmitted,
wherein the HARQ codebook switching information is configured according to carrier aggregation information, and the carrier aggregation information comprises at least one of following parameters:
a type of a service born in aggregated Component Carriers (CCs);
a traffic volume of the service born in the aggregated CCs; or
a manner of transmission of the service born in the aggregated CCs,
wherein the HARQ codebook switching information is information about switching between a first HARQ codebook format and a second HARQ codebook format,
where the first HARQ codebook format is determined by a maximum number of resource units in one of the aggregated CCs and a total number of times for which data is required to be transmitted by the aggregated CCs, and
the second HARQ codebook format is determined by the number of resource units in a CC in each CC group in the aggregated CCs and a total number of times for which data is required to be transmitted by a corresponding CC group, and CCs comprising a same number of resource units in the aggregated CCs are divided into a group.

11. The method of claim 10, further comprising:
when receiving the HARQ codebook switching information from the data receiver, receiving HARQ codebook interpretation information from the data receiver; and
storing the HARQ codebook interpretation information, where the HARQ codebook interpretation information referring to that each feedback bit corresponding to each codebook represents HARQ feedback information of a resource unit or HARQ feedback information of multiple resource units;
wherein the HARQ codebook switching information and the HARQ codebook interpretation information are represented by same information.

12. A data receiving apparatus, comprising:
a processor; and
a memory device configured to store instructions executable by the processor,
wherein the processor is configured to:
configure HARQ codebook switching information for a data sender according to carrier aggregation information; and
send the HARQ codebook switching information configured by the configuration portion to the data sender,
wherein the carrier aggregation information comprises at least one of following parameters:
a type of a service born in aggregated Component Carriers (CCs);
a traffic volume of the service born in the aggregated CCs; or a manner of transmission of the service born in the aggregated CCs, wherein the HARQ codebook switching information is information about switching between a first HARQ codebook format and a second HARQ codebook format, where the first HARQ codebook format is determined by a maximum number of resource units in one of the aggregated CCs and a total number of times for which data is required to be transmitted by the aggregated CCs, and the second HARQ codebook format is determined by the number of resource units in a CC in each CC group in the aggregated CCs and a total number of times for which data is required to be transmitted by a corresponding CC group, and CCs comprising a same number of resource units in the aggregated CCs are divided into a group.

13. The data receiving apparatus of claim 12, wherein the processor is further configured to:

when sending the HARQ codebook switching information to the data sender, send HARQ codebook interpretation information to the data sender, where the HARQ codebook interpretation information refers that each feedback bit corresponding to each HARQ codebook represents HARQ feedback information of a resource unit or HARQ feedback information of multiple resource units.

14. The data receiving apparatus of claim 12, wherein the processor is further configured to:

in response to that a total number of the aggregated CCs is less than a preset threshold, configure the first HARQ codebook format for the data sender; and in response to that a total number of the aggregated CCs is more than or equal to the preset threshold, configure the second HARQ codebook format for the data sender.

15. The data receiving apparatus of claim 12, wherein the processor is further configured to:

in response to that all of the aggregated CCs comprise a same number of resource units, configure the first HARQ codebook format for the data sender; and in response to that CCs in the aggregated CCs comprise different numbers of resource units, configure the second HARQ codebook format for the data sender.

16. The data receiving apparatus of claim 12, wherein the processor is further configured to:

in response to that the service born in the aggregated CCs does not comprise a preset service, configure the first HARQ codebook format for the data sender; and in response to that the service born in the aggregated CCs comprises the preset service, configure the second HARQ codebook format for the data sender.

17. The data receiving apparatus of claim 12, wherein the processor is further configured to:

in response to that the traffic volume of the service born in the aggregated CCs is larger than or equal to a preset traffic volume, configure the first HARQ codebook format for the data sender; and in response to that the traffic volume of the service born in the aggregated CCs is smaller than the preset traffic volume, configure the second HARQ codebook format for the data sender.

18. The data receiving apparatus of claim 12, wherein the processor is further configured to:

in response to transmission of the service born in the aggregated CCs being distributed in CCs comprising different numbers of resource units, configure the first HARQ codebook format for the data sender; and in response to transmission of the service born in the aggregated CCs being concentrated in CCs comprising a same number of resource units, configure the second HARQ codebook format for the data sender.

19. A data sending apparatus, comprising:

a processor; and a memory configured to store instructions executable by the processor, wherein the processor is configured to:

receive a Hybrid Automatic Repeat reQuest (HARQ) codebook switching information from a data receiver; and store the HARQ codebook switching information to process, according to the HARQ codebook switching information, a HARQ codebook fed back by the data receiver to determine resource unit information of data to be retransmitted, wherein the HARQ codebook switching information is configured according to carrier aggregation information, and the carrier aggregation information comprises at least one of following parameters:

a type of a service born in aggregated Component Carriers (CCs);

a traffic volume of the service born in the aggregated CCs; or a manner of transmission of the service born in the aggregated CCs, wherein the HARQ codebook switching information is information about switching between a first HARQ codebook format and a second HARQ codebook format, where the first HARQ codebook format is determined by a maximum number of resource units in one of the aggregated CCs and a total number of times for which data is required to be transmitted by the aggregated CCs, and the second HARQ codebook format is determined by the number of resource units in a CC in each CC group in the aggregated CCs and a total number of times for which data is required to be transmitted by a corresponding CC group, and CCs comprising a same number of resource units in the aggregated CCs are divided into a group.

20. The data sending apparatus of claim 19, wherein the processor is further configured to:

when receiving the HARQ codebook switching information from the data receiver, receive HARQ codebook interpretation information from the data receiver; and store the HARQ codebook interpretation information, where the HARQ codebook interpretation information refers to that each feedback bit corresponding to each codebook represents HARQ feedback information of a resource unit or HARQ feedback information of multiple resource units.

* * * * *